United States Patent
Cavalieri et al.

(10) Patent No.: US 10,385,199 B2
(45) Date of Patent: *Aug. 20, 2019

(54) LLDPE-CONTAINING IMPACT MODIFIER POLYOLEFIN COMPOSITION

(71) Applicant: BASELL POLIOLEFINE ITALIA S.R.L., Milan (IT)

(72) Inventors: Claudio Cavalieri, Ferrara (IT); Michele Grazzi, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 35 days.

This patent is subject to a terminal disclaimer.

(21) Appl. No.: 15/738,782

(22) PCT Filed: Jun. 22, 2016

(86) PCT No.: PCT/EP2016/064453
§ 371 (c)(1),
(2) Date: Dec. 21, 2017

(87) PCT Pub. No.: WO2016/207236
PCT Pub. Date: Dec. 29, 2016

(65) Prior Publication Data
US 2018/0186987 A1    Jul. 5, 2018

(30) Foreign Application Priority Data

Jun. 24, 2015 (EP) .................................... 15173696

(51) Int. Cl.
*C08L 23/16* (2006.01)
*C08L 23/20* (2006.01)
*C08F 210/16* (2006.01)

(52) U.S. Cl.
CPC ............ *C08L 23/20* (2013.01); *C08F 210/16* (2013.01); *C08L 23/16* (2013.01); *C08L 2205/02* (2013.01); *C08L 2205/025* (2013.01); *C08L 2205/03* (2013.01); *C08L 2205/035* (2013.01); *C08L 2308/00* (2013.01); *C08L 2310/00* (2013.01); *C08L 2314/02* (2013.01)

(58) Field of Classification Search
CPC ...... C08L 23/20; C08L 23/16; C08L 23/0815; C08L 23/12; C08L 2205/025; C08L 2205/035; C08L 2205/02; C08L 2308/00; C08L 2314/02; C08F 210/16; C08F 2/001; C08F 110/06; C08F 4/6492; C08F 210/06; C08F 2500/08; C08F 2500/12; C08F 2500/17

See application file for complete search history.

(56) References Cited

U.S. PATENT DOCUMENTS

| | | | |
|---|---|---|---|
| 6,743,864 B2 | 6/2004 | Glogovsky et al. | |
| 2008/0090062 A1* | 4/2008 | Breck et al. | B32B 27/32 428/220 |
| 2009/0306299 A1* | 12/2009 | Kipke et al. | C08F 10/00 525/240 |
| 2018/0179371 A1* | 6/2018 | Cavalieri et al. | C08L 23/12 |

FOREIGN PATENT DOCUMENTS

| | | |
|---|---|---|
| RU | 2304154 C2 | 8/2007 |
| WO | WO-2003076511 A1 | 9/2003 |
| WO | WO-2011076553 A1 | 6/2011 |
| WO | WO-2012000885 A1 | 1/2012 |

OTHER PUBLICATIONS

International Search Report and Written Opinion dated Aug. 19, 2016 (Aug. 19, 2016) for Corresponding PCT/EP2016/064453.

* cited by examiner

*Primary Examiner* — Nathan M Nutter

(57) ABSTRACT

Polyolefin compositions made from or containing:

(A) about 5 to about 35% by weight of a propylene-based polymer containing about 90% by weight or more of propylene units and containing about 10% by weight or less of a fraction soluble in xylene at 25° C. ($XS_A$);

(B) about 25 to about 50% by weight, of a copolymer of ethylene and a $C_3$-$C_8$ alpha-olefin containing from about 0.1% to about 15% by weight of alpha-olefin units and containing about 75% by weight or less of a fraction soluble in xylene at 25° C. ($XS_B$); and (C) about 30 to about 60% by weight, of a copolymer of ethylene and propylene containing from about 45% to about 75% by weight of ethylene units and containing from about 55% to about 95% by weight, of a fraction soluble in xylene at 25° C. ($XS_C$).

14 Claims, No Drawings

LLDPE-CONTAINING IMPACT MODIFIER POLYOLEFIN COMPOSITION

This application is the U.S. National Phase of PCT International Application PCT/EP2016/064453, filed Jun. 22, 2016, claiming benefit of priority to European Patent Application No. 15173696.4, filed Jun. 24, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polyolefin compositions, their preparation, and their use as impact modifiers in polyolefin blends.

BACKGROUND OF THE INVENTION

Impact modifier compositions made from or containing an amorphous olefin copolymer, may be added in polyolefin compositions to enhance the impact resistance. Applications include automotive applications.

There is a need for blends of impact modifier compositions and polyolefin materials, exhibiting a good balance of properties such as high values of impact resistance and elongation at break, without impairing the thermal shrinkage, and showing good optical properties.

SUMMARY OF THE INVENTION

In a general embodiment, the present disclosure provides a polyolefin composition made from or containing:
(A) from about 5 to about 35% by weight of a propylene-based polymer containing about 90% by weight or more of propylene units and containing about 10% by weight or less of a fraction soluble in xylene at 25° C. ($XS_A$), both the amount of propylene units and of the fraction $XS_A$ being referred to the weight of (A);
(B) from about 25 to about 50% by weight, of a copolymer of ethylene and a $C_3$-$C_8$ alpha-olefin containing from about 0.1% to about 20% by weight of alpha-olefin units and containing about 75% by weight or less of a fraction soluble in xylene at 25° C. ($XS_B$), both the amount of ethylene units and of the fraction $XS_B$ being referred to the weight of (B); and
(C) from about 30 to about 60% by weight, of a copolymer of ethylene and propylene containing from about 25% to about 75% by weight of ethylene units and containing from about 55% to about 95% by weight, of a fraction soluble in xylene at 25° C. ($XS_C$), both the amount of ethylene units and of the fraction $XS_C$ being referred to the weight of (C);
the amounts of (A), (B) and (C) being referred to the total weight of (A)+(B)+(C), wherein, following a progressive fractionation having a first, a second, and a third dissolution temperature (77° C., 100° C., and 130° C.) and the fraction collected at the second dissolution temperature corresponds to the second fractionation step and fraction 2, the composition has about 20% by weight or less of a fraction obtained in the second fractionation step (fraction 2).

In a general embodiment, the present disclosure provides a process for the preparation of the polyolefin compositions, including at least three sequential polymerization steps, wherein components (A), (B) and (C) are prepared in separate subsequent steps, operating in each step, except the first step, in the presence of the polymer formed and the catalyst used in the preceding step.

In a general embodiment, the present disclosure provides polyolefin blends made from or containing the polyolefin composition described above and at least about 50% by weight, referred to the total weight of the polyolefin composition, of one or more additional polyolefins.

In a general embodiment, the present disclosure provides formed articles, alternatively injection molded articles, made from or containing the polymer blends.

DETAILED DESCRIPTION OF THE INVENTION

As used herein, the term "copolymer" includes polymers containing more than one kind of comonomers, such as terpolymers.

In some embodiments the propylene-based polymer (A) may be present in amount of about 10 to about 30% by weight, alternatively in amount of about 15 to about 25% by weight, referred to the total weight of (A)+(B)+(C).

In some embodiments the propylene-based polymer (A) may contain about 95% by weight or more of propylene units, alternatively about 97% by weight or more of propylene units, referred to the weight of (A). The propylene polymer (A) may be a homopolymer or a copolymer containing units deriving from one or more comonomers selected from ethylene and $C_4$ to $C_{10}$ alpha-olefins. In some embodiments, the alpha-olefin comonomers are selected from the group consisting of butene-1, pentene-1, 4-methylpentene-1, hexene-1, octene-1 and decene-1. The propylene-based polymer (A) may also be a mixture of a homopolymer and a copolymer.

In some embodiments, the propylene-based polymer (A) may contain about 8% by weight or less of a fraction soluble in xylene at 25° C. ($XS_A$), alternatively 5% by weight or less of a fraction soluble in xylene at 25° C. ($XS_A$), referred to the weight of (A).

In some embodiments the propylene-based polymer (A) may have a melt flow rate (230° C./2.16 kg) between about 50 to about 200 g/10 min., alternatively between about 80 to about 170 g/10 min.

In some embodiments the copolymer of ethylene (B) may be present in amount of about 25 to about 45% by weight, alternatively of about 30 to about 40% by weight, referred to the total weight of (A)+(B)+(C).

In some embodiments, the copolymer of ethylene (B) may contain from about 0.1% to about 15% by weight of C3-C8 alpha-olefin units, referred to the weight of (B). In some embodiments, the alpha-olefin comonomers are selected from the group consisting of propylene, butene-1, pentene-1, 4-methylpentene-1, hexene-1 and octene-1.

In some embodiments the copolymer of ethylene (B) may contain about 60% by weight or less of a fraction soluble in xylene at 25° C. ($XS_B$), alternatively about 40% by weight or less of a fraction soluble in xylene at 25° C. ($XS_B$), referred to the weight of (B).

In some embodiments the copolymer of ethylene (B) may have a melt flow rate (230° C./2.16 kg) between about 0.1 to about 50 g/10 min., alternatively between about 0.5 to about 40 g/10 min., between about 1 to about 30 g/10 min.

In some embodiments the copolymer of ethylene (B) may have a density (determined according to ISO 1183 at 23° C.) of from about 0.915 to about 0.940 g/cm³.

In some embodiments the copolymer of ethylene and propylene (C) may be present in amount of about 35 to about 55% by weight, alternatively about 40 to about 55% by weight, referred to the total weight of (A)+(B)+(C).

In some embodiments the copolymer of ethylene and propylene (C) may contain from about 35% to about 70% by weight of ethylene units, alternatively from about 45% to about 65% by weight of ethylene units, referred to the weight of (B).

In some embodiments, the copolymer of ethylene and propylene (C) may contain from about 60% to about 95% by weight of a fraction soluble in xylene at 25° C. ($XS_C$), alternatively from about 65% to about 90% by weight of a fraction soluble in xylene at 25° C. ($XS_C$), referred to the weight of (C).

In some embodiments, the copolymer of ethylene and propylene (C) may also contain from about 10% to about 30% by weight, alternatively from about 15% to about 25% by weight of an alpha-olefin having 4 to 8 carbon atoms. In some embodiments, the C4-C8 alpha-olefins are selected from the group consisting of 1-butene, 1-hexene and 1-octene.

In some embodiments the polyolefin composition may have a melt flow rate (230° C./2.16 kg) between about 0.1 to about 6.0 g/10 min., alternatively between about 0.5 to about 5.5 g/10 min., between about 1.0 to about 5.0 g/10 min.

In some embodiments the polyolefin composition may contain from about 20% to about 65% by weight, of a fraction soluble in xylene at 25° C. ($XS_{TOT}$), alternatively from about 30% to about 55% by weight, of a fraction soluble in xylene at 25° C.

In some embodiments the polyolefin composition may have an intrinsic viscosity [η] (measured in tetrahydronaphthalene at 135° C.) of the XS fraction of about 1.0 dl/g or more, alternatively between about 2.0 to about 4.0 dl/g.

In some embodiments the polyolefin composition may have a total content of $C_4$-$C_8$ alpha-olefin units (determined by IR analysis) of about 1% by weight or higher, alternatively about 2% by weight or higher, alternatively about 3% by weight or higher.

In some embodiments the polyolefin composition may have one or more of the following additional features:
when following a progressive fractionation having a first, a second, and a third dissolution temperature (77° C., 100° C., and 130° C.) and the fraction collected at the second dissolution temperature corresponds to the second fractionation step and fraction 2, the fraction 2 shows the following features:
Amount of about 20 wt % or lower, alternatively about 17.5 wt % or lower, alternatively about 15 wt % or lower;
ethylene units (mol %)> about 96.0;
EEE %> about 95.0;
about 0.1<PPP< about 2.0;
about 0.1<EPE< about 1.0;
about 0.1<EBE< about 1.0;
XEX, XXE and BBB not detectable;
density of from about 0.89 to about 0.91 g/cm$^3$;
flexural modulus of from about 100 to about 500 MPa;
two melting peaks, one at temperature of from about 115° C. to about 125° C. and another at temperature of about 160° C. or higher;
glass transition temperature (Tg) from about −40° C. to about −50° C.;
an amount of total fraction extractable in hexane of about 10% or less by weight;
Shore hardness (Shore D—ISO 868) of about 20 to about 30;
Vicat softening temperature A/50 (ISO 306) of from about 40° C. to about 100° C.;
elongation at break equal or higher than about 170%;
Gloss at 60° higher than about 20%
longitudinal shrinkage lower than about 0.50%; and/or
IZOD impact strength at −30° C. higher than about 40 KJ/m$^2$.

In a general embodiment, various polymerization processes and catalysts can be used to prepare the polyolefin compositions disclosed herein. In some embodiments, the polyolefin compositions can be prepared by a sequential polymerization, including at least three sequential steps, wherein components (A), (B) and (C) are prepared in separate subsequent steps, operating in each step, except the first step, in the presence of the polymer formed and the catalyst used in the preceding step. The catalyst is added in the first step. The catalyst remains active for the subsequent steps.

The polymerization, which can be continuous or batch, is carried out in liquid phase, in the presence or not of inert diluent, or in gas phase, or by mixed liquid-gas techniques. In some embodiments, the polymerization is carried out in gas phase.

In some embodiments, the reaction temperature is from about 50 to about 100° C. In some embodiments, the reaction pressure can be atmospheric or higher.

In some embodiments, the regulation of the molecular weight is carried out by using regulators. In some embodiments, the regulator is hydrogen.

In some embodiments, the polymerizations are carried out in the presence of a Ziegler-Natta catalyst. In some embodiments, the Ziegler-Natta catalyst is made from or contains a product of the reaction of an organometallic compound of group 1, 2 or 13 of the Periodic Table of elements with a transition metal compound of groups 4 to 10 of the Periodic Table of Elements (new notation). In some embodiments, the transition metal compound can be selected among compounds of Ti, V, Zr, Cr and Hf. In some embodiments, the transition metal compound is supported on $MgCl_2$.

In some embodiments, catalysts are made from or contain the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the ethylene polymer composition is obtainable by using a Ziegler-Natta polymerization catalyst, alternatively a Ziegler-Natta catalyst supported on $MgCl_2$, alternatively a Ziegler-Natta catalyst made from or containing the product of reaction of:
1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains as electron-donor a compound selected among the group consisting of ethers, ketones, lactones, compounds containing N, P and/or S atoms, and mono- and dicarboxylic acid esters.

In some embodiments, the catalysts can be selected from those catalysts disclosed in U.S. Pat. No. 4,399,054 and European Patent No. 45977, both incorporated herein by reference.

In some embodiments, the electron-donor compounds are selected from the group consisting of phthalic acid esters and succinic acid esters. In some embodiments, the electron-donor compound is diisobutyl phthalate.

In some embodiments, the succinic acid esters are represented by the formula (I):

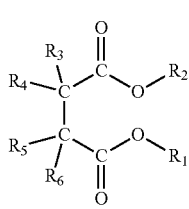

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is selected from the group consisting of a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, at least two radicals different from hydrogen are linked to different carbon atoms, that is $R_3$ and $R_5$ or $R_4$ and $R_6$.

In some embodiments, the electron-donors are the 1,3-diethers. In some embodiments, the 1,3-diethers are as disclosed in European Patent Application Nos. EP-A-361 493 and 728769, both incorporated herein by reference.

In some embodiments, cocatalysts (2) use trialkyl aluminum compounds, alternatively selected from the group consisting of Al-triethyl, Al-triisobutyl and Al-tri-n-butyl.

The electron-donor compounds (3) that can be used as external electron-donors (added to the Al-alkyl compound) can be selected from the group consisting of aromatic acid esters (such as alkylic benzoates), heterocyclic compounds (such as 2,2,6,6-tetramethylpiperidine and 2,6-diisopropylpiperidine), and silicon compounds containing at least one Si—OR bond (where R is a hydrocarbon radical).

In some embodiments, the silicon compounds are those of formula $R^1{}_aR^2{}_bSi(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, 1,3-diethers are used as external donors. In some embodiments, the internal donor is a 1,3-diether and the external donor is omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from about 0.5 to about 3 times the weight of the catalyst.

The operation can also take place in liquid monomer, producing a quantity of polymer up to about 1000 times the weight of the catalyst.

The polyolefin compositions can also contain additives, such as antioxidants, light stabilizers, heat stabilizers, colorants and fillers.

In a general embodiment, the polyolefin compositions can be prepared as a physical blend of the separately-prepared components rather than as a reactor blend.

In some embodiments, the polyolefin composition can be compounded with additional polyolefins. In some embodiments, the propylene polymers are selected from the group consisting of propylene homopolymers, random copolymers, thermoplastic elastomeric polyolefin compositions and plastomers. In some embodiments, the polyolefin composition contains the ethylene polymer composition. In some embodiments, the polyolefin composition is made from or contains at least about 50% by weight, alternatively from about 50% to about 90% by weight, of one or more additional polyolefins, and about 50% or less, alternatively from about 10% to about 50% by weight, of the ethylene polymer composition, percent amounts being referred to the total weight of the ethylene polymer composition and of the additional polyolefin or polyolefins.

In some embodiments, the additional polyolefins are selected from the group consisting of the following polymers:

1) crystalline propylene homopolymers, alternatively isotactic or mainly isotactic homopolymers;
2) crystalline propylene copolymers with ethylene and/or a $C_4$-$C_{10}$ α-olefin, wherein the total comonomer content ranges from about 0.05 to about 20% by weight with respect to the weight of the copolymer;
3) crystalline ethylene homopolymers and copolymers with propylene and/or a $C_4$-$C_{10}$ α-olefin;
4) thermoplastic elastomeric compositions made from or containing one or more of propylene homopolymers and/or the copolymers of item 2) and an elastomeric moiety made from or containing one or more copolymers of ethylene with propylene and/or $C_4$-$C_{10}$ α-olefins, optionally containing minor quantities of a diene, such as butadiene, 1,4-hexadiene, 1,5-hexadiene and ethylidene-1-norbornene;
5) ethylene copolymers containing up to about 45% by weight, alternatively from about 10 to about 42% by weight, of an olefin comonomer and having Shore A hardness of about 90 points or less;
6) propylene copolymers containing up to about 40% by weight of an olefin comonomer and having Shore A hardness of about 90 points or less.

In some embodiments, the $C_4$-$C_{10}$ α-olefins of the crystalline propylene copolymers (2) are selected from the group consisting of 1-butene; 1-hexene; 4-methyl-1-pentene and 1-octene. In some embodiments, the crystalline ethylene polymer (3) is HDPE. In some embodiments, the diene content of the thermoplastic elastomeric compositions (4) is from about 1 to about 10% by weight. In some embodiments, the thermoplastic elastomeric compositions are prepared by mixing the components in the molten state or by sequential polymerization. In some embodiments, the elastomeric moiety of the thermoplastic elastomeric compositions is present in quantities from about 5 to about 80% by weight. In some embodiments, the olefin comonomer of the ethylene copolymers (5) is a $C_3$-$C_{10}$ α-olefin. In some embodiments, the $C_3$-$C_{10}$ α-olefin is butene-1 or octene-1. In some embodiments, the olefin comonomer of the propylene copolymers (6) is ethylene or a $C_4$-$C_{10}$ α-olefin.

In some embodiments, the ethylene copolymers 5) are products marketed by Dow Chemical under the trademark Engage™ and Affinity™ or by ExxonMobil Chemical under the trademark Exact™.

In some embodiments, the propylene copolymers 6) are products marketed by Dow Chemical under the trademark Versify™, by ExxonMobil Chemical under the trademark Vistamaxx™ and by Mitsui Chemicals under the trademark Notio™.

The polyolefin blends may be manufactured by mixing the ethylene polymer composition and the additional polyolefin(s) together, extruding the mixture, and pelletizing the resulting composition.

The polyolefin blends may also contain additives such as mineral fillers, fibers, colorants and stabilizers. Some mineral fillers include talc, $CaCO_3$, silica, such as wollastonite ($CaSiO_3$), clays, diatomaceaous earth, titanium oxide and zeolites. In some embodiments, the mineral filler is in particle form having an average diameter ranging from about 0.1 to about 5 micrometers. In some embodiments, the fibers include glass fibers, carbon fibers, metallic or ceramic fibers.

In a general embodiment, the present disclosure provides articles. In some embodiments, the articles are injection molded articles, such as finished parts for the automotive industry, made of or containing the polyolefin blends. In some embodiments, the polyolefin blends can be injection molded into large objects which exhibit low values of thermal shrinkage in combination with enhanced mechanical properties, like impact strength and elongation at break.

EXAMPLES

These examples are illustrative and not intended to limit the scope of this disclosure in any manner whatsoever.

The following analytical methods are used to characterize the polymer compositions.

Melting Temperature (ISO 11357-3)

Determined by differential scanning calorimetry (DSC). A sample weighting 6±1 mg is heated to 200±1° C. at a rate of 20° C./min and kept at 200±1° C. for 2 minutes in nitrogen stream and thereafter cooled at a rate of 20° C./min to 40±2° C., thereby kept at this temperature for 2 min. Then, the sample is again melted at a temperature rise rate of 20° C./min up to 200° C.±1. The melting scan is recorded, a thermogram is obtained, and temperatures corresponding to peaks are read. The temperature corresponding to the two most intense melting peaks recorded during the second fusion is taken as the melting temperature. The fusion enthalpy $\Delta H_{fus}$ is measured on both most intense melting peaks. If only one peak is detected, both melting temperature and $\Delta H_{fus}$ are measured on that peak. To determine fusion enthalpy $\Delta H_{fus}$, the base-line is constructed by connecting the two closest points at which the melting endotherm peak deviate from the baseline. The heat of fusion ($\Delta H_{fus}$) is then calculated by integrating the area between DSC heat flow recorded signal and constructed baseline.

Xylene Soluble Fraction 2.5 g of polymer and 250 cm³ of o-xylene are introduced in a glass flask equipped with a refrigerator and a magnetic stirrer. The temperature is raised in 30 minutes from room temperature up to the boiling point of the solvent (135° C.). The obtained clear solution is then kept under reflux and stirring for further 30 minutes. The closed flask is then kept in a thermostatic water bath at 25° C. for 30 minutes as well. The formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum to dryness and then weighed after constant weight is obtained, thereby calculating the percent by weight of polymer soluble and insoluble in xylene at 25° C.

Melt Flow Rate

Measured according to ISO 1133 at 230° C. with a load of 2.16 kg, unless otherwise specified.

Intrinsic Viscosity [η]

The sample is dissolved in tetrahydronaphthalene at 135° C. and then poured into a capillary viscometer. The viscometer tube (Ubbelohde type) is surrounded by a cylindrical glass jacket, thereby permitting temperature control with a circulating thermostated liquid. The downward passage of the meniscus is timed by a photoelectric device.

The passage of the meniscus in front of the upper lamp starts the counter which has a quartz crystal oscillator. The meniscus stops the counter as meniscus passes the lower lamp and the efflux time is registered. The efflux time is converted into a value of intrinsic viscosity through Huggins' equation based upon the flow time of the pure solvent at the same experimental conditions (same viscometer and same temperature). See Huggins, M. L., *J. Am. Chem. Soc.*, 1942, 64, 2716, incorporated herein by reference. A single polymer solution is used to determine [η].

Comonomer ($C_2$ and $C_4$) Content

The content of comonomers was determined by infrared spectroscopy by collecting the IR spectrum of the sample vs. an air background with a Fourier Transform Infrared spectrometer (FTIR). The instrument data acquisition parameters were:
  purge time: 30 seconds minimum
  collect time: 3 minutes minimum
  apodization: Happ-Genzel
  resolution: 2 cm⁻¹.

Sample Preparation—Using a hydraulic press, a thick sheet was obtained by compression molding about 1 gram of sample between two aluminum foils. A small portion was cut from this sheet to mold a film. The film thickness was set in order to have a maximum absorbance of the $CH_2$ absorption band recorded at ~720 cm⁻¹ of 1.3 au. (% Transmittance>5%). Molding conditions were 180±10° C. (356° F.) and pressure was around 10 kg/cm² (142.2 PSI) for about one minute. The pressure was then released. The sample was removed from the press and cooled to room temperature. The spectrum of pressed film sample was recorded in absorbance vs. wavenumbers (cm⁻¹). The following measurements were used to calculate ethylene ($C_2$) and 1-butene ($C_4$) contents:
  a) Area ($A_t$) of the combination absorption bands between 4482 and 3950 cm⁻¹ which are used for spectrometric normalization of film thickness.

b) Area ($A_{C2}$) of the absorption band due to methylenic sequences ($CH_2$ rocking vibration) in the range 660 to 790 $cm^{-1}$ after a proper digital subtraction of an isotactic polypropylene (IPP) and a $C_2C_4$ references spectrum.

c) The factor of subtraction ($FCR_{C4}$) between the spectrum of the polymer sample and the $C_2C_4$ reference spectrum. The reference spectrum was obtained by digital subtraction of a linear polyethylene from a $C_2C_4$ copolymer, in order to extract the $C_4$ band (ethyl group at ~771 cm-1).

The ratio $A_{C2}/A_t$ was calibrated by analyzing ethylene-propylene standard copolymers of reference compositions, determined by NMR spectroscopy. In order to calculate the ethylene ($C_2$) and 1-butene ($C_4$) content, calibration curves were obtained by using reference samples with ethylene and 1-butene detected by $^{13}C$-NMR.

Calibration for ethylene—A calibration curve was obtained by plotting $A_{C2}/A_t$ versus ethylene molar percent (% C2m), and the coefficient $a_{C2}$, $b_{C2}$ and $C_{C2}$ then calculated from a "linear regression".

Calibration for 1-butene—A calibration curve was obtained by plotting $FCR_{C4}/A_t$ versus butane molar percent (% $C_4$m) and the coefficients $a_{C4}$, $b_{C4}$ and $C_{C4}$ then calculated from a "linear regression".

The spectra of the samples were recorded and then ($A_t$), ($A_{C2}$) and ($FCR_{C4}$) of the sample were calculated.

The ethylene content (% molar fraction C2m) of the sample was calculated as follows:

$$\%C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4m) of the sample was calculated as follows:

$$\%C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

$a_{C4}$, $b_{C4}$, $C_{C4}$ ace, $b_{C2}$, $c_{C2}$ were the coefficients of the two calibrations.

Changes from mol % to wt % were calculated by using molecular weights.

Preparative fractionations were carried out on base polymers by using a specific dissolution and crystallization protocol. A progressive dissolution was performed to collect polymer fractions. Polymer fractionation was performed using PREP mc2 (Polymer Characterization, S. A.). Ortho xylene stabilized with Irganox 1010 is used for the following steps.

PREP mc2 vessel was charged by feeding 0.4 g of polymer and 100 ml of o-xylene at room temperature. Initial dissolution step was carried out by increasing the temperature from room temperature up to 130° C. (heating ramp 20° C./min). The vessel temperature remained at 130° C. for 60 minutes under discontinuous stirring (220 rpm). A subsequent stabilization was carried out for 5 minutes at 125° C. under discontinuous stirring (150 rpm). A crystallization step was carried out by lowering the temperature from 125° C. to 77° C. with a cooling rate of 0.10° C./minute in 480 minutes. A, 77° C. an equilibration step occurred (200 minutes without stirring). After this, the progressive sample fractionation started with collecting solutions at 3 different dissolution temperatures (77, 100 and 130° C.). For each temperature, 3 dissolutions were performed and 3 fractions were collected named fraction 1 (dissolution temperature 77° C.), fraction 2 (dissolution temperature 100° C.) and fraction 3 (dissolution temperature 130° C.). For the first temperature (77° C.) after 30 minutes under discontinuous stirring (150 rpm), the first polymer solution was collected by emptying the vessel. Next, 100 ml of fresh solvent was then added, the temperature was equilibrated at 77° C. (20° C./minute) and after 30 minutes under discontinuous stirring (150 rpm) the second polymer solution was collected. The same step was repeated for a third solution. The temperature was then raised to 100° C. (20° C./minute) and after an equilibration step of 30 minutes under discontinuous stirring (150 rpm) a first polymer solution was collected. A second and a third solution were collected as previously described (fraction at 77° C.). The temperature was then raised to 130° and three solutions were collected as described in the 100° C. step. Fractions collected at the same temperature were gathered in the same vessel, concentrated by solvent evaporation and then recovered by precipitation using acetone addition (the acetone volume was 2 times the final polymer solution volume). The polymer was filtered and weighed after drying in vacuum oven at 75° C. and under nitrogen flux. The drying, cooling and weighing steps were repeated until 2 consecutive weighings agree within 0.0002 g.

The relative amount of polymer collected for each temperature was estimated in weight % (using as 100% the total recovered polymer). In this protocol the polymer oligomers were not recovered, which were believed to be present in an amount of about 1 wt %. The experiment was considered successful if the difference between the initial polymer weight and the total weight was less than 2%. Repeated experiments provided a confidence interval lower that 5%.

$^{13}C$ NMR $^{13}C$ NMR spectra of base polymers and their fractions were acquired on a Bruker AV600 spectrometer equipped with cryo probe, operating 150.91 MHz MHz in the Fourier transform mode at 120° C. The peak of the Sδδ carbon (nomenclature according C. J. Carman, R. A. Harrington and C. E. Wilkes, Macromolecules, 10, 3, 536 (1977), incorporated herein by reference) was used as an internal reference at 29.7 ppm. About 30 mg of sample were dissolved in 0.5 ml of 1,1,2,2 tetrachloro ethane d2 at 120° C. Each spectrum was acquired with a 90° pulse, 15 seconds of delay between pulses and CPD to remove 1H-$^{13}C$ coupling. 512 transients were stored in 65 K data points using a spectral window of 9000 Hz. The assignments of the spectra were made according to M. Kakugo, Y. Naito, K. Mizunuma and T. Miyatake, Macromolecules, 16, 4, 1160 (2082) and E. T. Hsieh, J. C. Randall, Macromolecules, 15, 353-360 (1982), both incorporated herein by reference.

Triad distribution was obtained using the following relations:

$PPP=100I_{10}/\Sigma$ $PPE=100I_6/\Sigma EPE=100I_5/\Sigma$ $BBB=100I_3/\Sigma$ $BBE=100I_2/\Sigma$ $EBE=100I_{11}/\Sigma$ $XEX=100I_{12}/\Sigma$ $$XEE = 100(I_1+I_4)/\Sigma$$

$$EEE = 100(0.5I_9+0.25(I_7+I_8))/\Sigma$$

wherein
$\Sigma=I_1+I_2+I_3+I_4+I_5+I_6+0.25I_7+0.25I_8+0.5I_9+I_{10}+I_{11}+I_{12}$ and wherein X can be propylene (P) or 1-butene (B), and $I_1$ to $I_{12}$ are the areas of the corresponding carbon atoms as reported below (selected triads and assignments being reported):

| Number | Chemical Shift (ppm) | Carbon | Sequence |
|---|---|---|---|
| $I_1$ | 37.64-37.35 | $S_{\alpha\delta}$ | PEE |
| $I_2$ | 37.35-37.15 | $T_{\beta\delta}$ | BBE |
| $I_3$ | 35.27-34.92 | $T_{\beta\beta}$ | BBB |
| $I_4$ | 34.39-33.80 | $S_{\alpha\delta}$ | BEE |
| $I_5$ | 33.13 | $T_{\delta\delta}$ | EPE |
| $I_6$ | 30.93-30.77 | $T_{\beta\delta}$ | PPE |
| $I_7$ | 30.39 | $S_{\gamma\delta}$ | BEEE |
| $I_8$ | 30.29 | $S_{\gamma\delta}$ | PEEE |
| $I_9$ | 29.97 | $S_{\delta\delta}$ | EEE |
| $I_{10}$ | 29.14-28.31 | $T_{\beta\beta}$ | PPP |
| $I_{11}$ | 26.70-26.55 | $2B_2$ | EBE |
| $I_{12}$ | 24.88-24.14 | $S_{\beta\beta}$ | XEX |

The molar contents of ethylene (E), propylene (P) and 1-butene (B) were obtained from triads using the following relations:

$$E(m\%)=EEE+XEE+XEX$$

$$P(m\%)=PPP+PPE+EPE$$

$$B(m\%)=BBB+BBE+EBE$$

Tg Determination Via DMTA (Dynamic Mechanical Thermal Analysis)

Molded specimen of 20 mm×5 mm×1 mm were fixed to the DMTA machine for tensile stress. The frequency of the sinusoidal oscillation was fixed at 1 Hz. The DMTA translated the elastic response of the specimen starting from −100° C. (glassy state) to 130° C. (softening point). The elastic response versus temperature was plotted. The elastic modulus in DMTA for a viscoelastic material was defined as the ratio between stress and strain also defined as complex modulus $E^*=E'+iE''$. The DMTA can split the two components E' and E" by their resonance. E' (elastic component), E" (loss modulus) and E"/E'=tan δ (damping factor) were plotted against temperature. The glass transition temperature Tg was believed to be the temperature at the maximum of the curve tan=(δ) E"/E' vs temperature.

Shore D (Sh.D) Hardness

Measured on a compression molded plaques (thickness of 4 mm) following the ISO 868.

Hexane Extractable Fraction

Determined according to FDA 177.1520, by suspending in an excess of hexane a 100 μm thick film specimen of the composition being analyzed, in an autoclave at 50° C. for 2 hours. The hexane was then removed by evaporation and the dried residue was weighed.

Flexural Modulus*

ISO 178, measured 24 hours after molding.

Tensile Strength at Yield*

ISO 527, measured 24 hours after molding.

Tensile Strength at Break*

ISO 527, measured 24 hours after molding.

Elongation at Break and at Yield*

ISO 527, measured 24 hours after molding.

Notched IZOD Impact Test*

ISO 180/1A, measured at 23° C., −20° C. and −30° C., 24 hours after molding.

Vicat Temperature*

Determined according to DIN EN ISO 306, after 24 hours (10 N load).

Heat Distortion Temperature (HDT)*

Determined according to ISO 75, after 24 hours.

Test specimens were prepared by injection molding according to ISO 1873-2: 1989.

Gloss at 60°

A ISO D1 plaque of 1 mm was molded in an injection molding machine "NB 60" (where 60 stands for 60 tons of clamping force) in accordance with the following parameters.

Melt temperature=260° C.,
Mold temperature=40° C.,
Injection speed=100 mm/sec,
Holding time=10 sec,
Screw rotation=120 rpm Injection and Holding pressures were set-up to assure a complete filling of the mold thus avoiding flashes. Alternatively an injection molding machine "NB VE70" (where 70 stands for 70 tons of clamping force) was used. Gloss @ 60° was measured on the plaque according to ASTM D 2457.

Longitudinal and Transversal Thermal Shrinkage

A plaque of 100×200×2.5 mm was molded in an injection molding machine "SANDRETTO serie 7 190" (where 190 stands for 190 tons of clamping force).

The injection conditions were:
melt temperature=250° C.;
mold temperature=40° C.;
injection time=8 seconds;
holding time=22 seconds;
screw diameter=55 mm.

The plaque was measured 24 hours after molding, through calipers, and the shrinkage was given by:

$$\text{Longitudinal shrinkage} = \frac{200 - \text{read\_value}}{200} \times 100$$

$$\text{Transversal shrinkage} = \frac{100 - \text{read\_value}}{100} \times 100$$

wherein 200 was the length (in mm) of the plaque along the flow direction, measured immediately after molding; 100 is the length (in mm) of the plaque crosswise the flow direction, measured immediately after molding; the read_value is the plaque length in the relevant direction.

Examples 1-3 (of Disclosed Composition) and 4C-9C (Comparison)—Preparation of Polyolefin Composition Catalyst Precursor The solid catalyst component used in polymerization was a Ziegler-Natta catalyst component supported on magnesium chloride, containing titanium and diisobutylphthalate as internal donor, prepared as follows. An initial amount of microspheroidal $MgCl_2 \cdot 2.8C_2H_5OH$ was prepared according to the method described in Example 2 of U.S. Pat. No. 4,399,054 (incorporated herein by reference) but operating at 3,000 rpm instead of 10,000. The adduct was then subjected to thermal dealcoholation at increasing temperatures from 30 to 130° C. operating in nitrogen current until the molar alcohol content per mol of Mg was 1.16. Into a 1000 mL four-necked round flask, purged with nitrogen, 500 mL of TiCl$_4$ were introduced at 0° C. While stirring, 30 grams of the microspheroidal MgCl$_2$.1.16C$_2$H$_5$OH adduct were added. The temperature was raised to 120° C. and kept at this value for 60 minutes. During the temperature increase, an amount of diisobutylphthalate was added such as to have a Mg/diisobutylphthalate molar ratio of 18. Next, the stirring was stopped, the liquid siphoned off and the treatment with TiCl$_4$ was repeated at 100° C. for 1 hour in the presence of an amount of diisobutylphthalate such as to have a Mg/diisobutylphthalate molar ratio of 27. Next, the stirring was stopped, the liquid siphoned off and the treatment with TiCl$_4$ was repeated at 100° C. for 30 min. After sedimentation and siphoning at 85° C. the solid was washed six times with anhydrous hexane (6×100 ml) at 60° C.

Catalyst System and Prepolymerization

Before introduction into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio equaled 4. The catalyst system was then subjected to prepolymerization by maintaining the catalyst system in suspension in liquid propylene at 50° C. for about 75 minutes before introducing the catalyst system into a first polymerization reactor.

Polymerization

The polymerization was carried out continuously in a series of three gas-phase reactors equipped with devices to transfer the product from the first reactor to a second reactor. Into the first gas phase polymerization reactor a propylene-based polymer (A) was produced by feeding in a continuous and constant flow the prepolymerized catalyst system, hydrogen (used as molecular weight regulator) and propylene in the gas state. The propylene-based polymer (A) coming from the first reactor was discharged in a continuous flow and, after having been purged of unreacted monomers, was introduced, in a continuous flow, into the second gas phase reactor, together with quantitatively constant flows of hydrogen and ethylene, in the gas state. In the second reactor a copolymer of ethylene (B) was produced. The product coming from the second reactor was discharged in a continuous flow and, after having been purged of unreacted monomers, was introduced, in a continuous flow, into a third gas phase reactor, together with quantitatively constant flows of hydrogen, ethylene and propylene in the gas state. In the third reactor an ethylene-propylene polymer (C) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried.

Thereafter the polymer particles were mixed with a stabilizing additive composition in a twin screw extruder Berstorff ZE 25 (length/diameter ratio of screws: 34) and extruded under nitrogen atmosphere in the following conditions:
Rotation speed: 250 rpm;
Extruder output: 15 kg/hour;
Melt temperature: 245° C.
The stabilizing additive composition was made of the following components:
  0.1% by weight of Irganox® 1010;
  0.1% by weight of Irgafos® 168;
  0.04% by weight of DHT-4A (hydrotalcite);
percent amounts being referred to the total weight of the polymer and stabilizing additive composition. Irganox® 1010 is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, while Irgafos® 168 is tris(2,4-di-tert.-butylphenyl)phosphite. The characteristics relating to the polymer composition, reported in Table 2, were obtained from measurements carried out on the extruded polymer.

Examples 10-12 (of Disclosed Composition) and 13C-18C (Comparison)—Preparation of Polyolefin Blends The stabilized polyolefin composition were blended by extrusion with the components reported below:
  35% by weight of Moplen 2000HEXP an heterophasic polypropylene commercialized by LyondellBasell;
  12% by weight of talc HTP Ultra 5C: fine talc powder made from or containing about 98% by weight of particles having particle size of less than 5 μm;
  1.3% by weight of carbon black master-batch having total MFR of about 0.6 g/10 min. (measured according to ISO 1133 at 230° C./5 kg load) and made of 40% by weight of carbon black and 60% of a copolymer of propylene with 8% by weight of ethylene, having MFR of about 45 g/10 min;
  0.1% by weight of Irganox® 1010;
  0.1% by weight of Irgafos® 168.
The talc filled stabilized blend was extruded under nitrogen atmosphere in a twin screw extruder Leistritz 27 mm (length/diameter ratio of screws: 40) in the following conditions:
Rotation speed: 350 rpm;
Extruder output: 25 kg/hour;
Melt temperature: 240° C.
The properties of the final composition are also reported in Table 3.

TABLE 1

| | | \multicolumn{9}{c}{Polymerization conditions} | | | | | | | | |
|---|---|---|---|---|---|---|---|---|---|
| Example | | 1 | 2 | 3 | 4C | 5C | 6C | 7C | 8C | 9C |
| | | \multicolumn{9}{c}{1$^{st}$ Reactor - component (A)} | | | | | | | | |
| Temperature | ° C. | 60 | 60 | 60 | 60 | 61 | 60 | 60 | 69 | 60 |
| Pressure | barg | 16 | 16 | 16 | 16 | 16 | 16 | 18 | 18 | 16 |
| H$_2$/C$_3$– | mol. | 0.21 | 0.18 | 0.24 | 0.2 | 0.23 | 0.2 | 0.2 | 0.16 | 0.23 |
| Split | wt % | 21 | 18 | 22 | 20 | 19 | 20 | 25 | 37 | 23 |
| Xylene soluble of (A) (XS$_A$) | wt % | 3.7 | 3.8 | 4.2 | 4.0 | 4.3 | 3.6 | 2.9 | 2.6 | 3.9 |
| MFR of (A) | g/10 min. | 96 | 99 | 110 | 96 | 96 | 100 | 160 | 130 | 160 |

TABLE 1-continued

Polymerization conditions

| Example | | 1 | 2 | 3 | 4C | 5C | 6C | 7C | 8C | 9C |
|---|---|---|---|---|---|---|---|---|---|---|
| $2^{nd}$ Reactor - component (B) | | | | | | | | | | |
| Temperature | °C. | 85 | 80 | 80 | 80 | 85 | 81 | 60 | 82 | 96 |
| Pressure | barg | 17 | 18 | 18 | 17 | 18 | 17 | 16 | 18 | 18 |
| $H_2/C_2-$ | mol. | 0.2 | 0.77 | 0.81 | 0.3 | 1.01 | 0.3 | 0.1 | 0.21 | 0.75 |
| $C_4-/(C_2- + C_4-)$ | mol. | 0.17 | 0.25 | 0.25 | 0 | 0 | 0 | 0 | 0 | 0 |
| $C_2-/(C_2- + C_3-)$ | mol. | 0.97 | 0.98 | 0.98 | 0.95 | 0.94 | 0.9 | 0.49 | 0.99 | 0.99 |
| Split | wt % | 31 | 33 | 32 | 32 | 34 | 31 | 30 | 20 | 36 |
| $C_2-$ content of B * | wt % | 90 | 89 | 90 | 100 | 100 | 100 | 61 | 100 | 100 |
| $C_4-$ content of B * | wt % | 10 | 11 | 10 | n.d. | n.d. | n.d. | n.d. | n.d. | nd |
| $C_2-$ content of (A + B) | wt % | 53.7 | 57.7 | 53.1 | 60.6 | 63.9 | 60.8 | 33.3 | 36 | 62.3 |
| $C_4-$ content of (A + B) | wt % | 6.0 | 7.6 | 5.9 | n.d. | n.d. | n.d. | n.d. | n.d. | nd |
| Xylene soluble of B ($XS_B$) * | wt % | 16.0 | 20.0 | 16.0 | 1.0 | 1.0 | 1.0 | 76 | 1.0 | 1.0 |
| Xylene soluble of (A + B) | wt % | 15.0 | 12.6 | 12.0 | 2.0 | 1.5 | 1.5 | 42.0 | 2.0 | 2.0 |
| MFR of B ($MFR_B$) * | g/10 min. | 0.6 | 11.2 | 16.5 | 0.7 | 8.5 | 0.4 | 0.14 | 0.3 | 37 |
| MFR of (A + B) | g/10 min. | 4.4 | 24.1 | 35.9 | 4.6 | 20.4 | 3.30 | 3.45 | 52.8 | 64 |
| $3^{rd}$ Reactor - component (C) | | | | | | | | | | |
| Temperature | °C. | 65 | 65 | 65 | 65 | 65 | 65 | 60 | 60 | 65 |
| Pressure | barg | 18 | 16 | 18 | 18 | 18 | 18 | 16 | 16 | 18 |
| $H_2/C_2-$ | mol. | 0.30 | 0.17 | 0.17 | 0.25 | 0.26 | 0.31 | 0.10 | 0.10 | 0.30 |
| $C_2-/(C_2- + C_3-)$ | mol. | 0.51 | 0.50 | 0.42 | 0.47 | 0.48 | 0.45 | 0.49 | 0.49 | 0.47 |
| Split | wt % | 48 | 49 | 46 | 48 | 47 | 49 | 45 | 43 | 41 |
| $C_2-$ content of C * | wt % | 60 | 60 | 52 | 63 | 63 | 62 | 61 | 60 | 64 |
| $C_2-$ content of (A + B + C) | wt % | 54.9 | 58.2 | 52.8 | 62.1 | 63.9 | 61.8 | 44.5 | 45.8 | 64.4 |
| $C_4-$ content of (A + B + C) | wt % | 3.1 | 4.2 | 2.8 | n.d. | n.d. | n.d. | n.d. | n.d. | n.d. |
| Xylene soluble of (C) ($XS_C$) * | wt % | 76 | 76 | 83 | 74 | 74 | 75 | 76 | 76 | 72 |

Notes:
$C_2-$ = ethylene (IR); $C_3-$ = propylene (IR); $C_4-$ = 1-butene (IR); split = amount of polymer produced in the concerned reactor.
* Calculated values.

TABLE 2

Properties of polymer composition

| Example | | 1 | 2 | 3 | 4C | 5C | 6C | 7C | 8C | 9C |
|---|---|---|---|---|---|---|---|---|---|---|
| MFR | g/10 min. | 1.23 | 2.05 | 1.61 | 0.70 | 1.29 | 0.87 | 0.69 | 2.29 | 6.71 |
| Density | gr/cc | 0.893 | 0.894 | 0.893 | 0.898 | 0.904 | 0.897 | n.a. | n.a. | 0.910 |
| ΔHfus | J/g | 47.3 | 61.9 | 42.8 | 70.1 | 78.0 | 72.7 | 34.5 | 78.2 | 75.7 |
| Tm1 | °C. | 120.6 | 120.3 | 120.6 | 126.6 | 129.0 | 126.8 | 118.4 | 130.1 | 129.4 |
| Tm2 | °C. | 163.3 | 163.1 | 163.1 | 163.6 | 163.6 | 163.1 | 160.4 | 162.1 | 159.4 |
| Xylene soluble ($XS_{TOT}$) | wt % | 42.1 | 40.2 | 44.5 | 36.7 | 34.9 | 39.6 | 54.9 | 32.7 | 28.5 |
| Intrinsic Viscosity of $XS_{TOT}$ | dl/g | 2.20 | 2.42 | 2.45 | 2.67 | 2.77 | 2.27 | 3.38 | 3.44 | 2.22 |
| $C_2-$ content of $XS_{TOT}$ | wt % | n.a. | n.a. | n.a. | 55.3 | 57.8 | 54.7 | 54.6 | 53.9 | 57.5 |
| Total $C_2-$ content | wt % | 54.7 | 59.0 | 54.8 | 65.8 | 66.0 | 63.2 | 44.5 | 49.9 | 63.4 |
| Total $C_4-$ content | wt % | 4.6 | 5.1 | 4.7 | n.d. | n.d. | n.d. | n.d. | n.d. | n.d. |
| Flexural Modulus | MPa | 160 | 205 | 170 | 210 | 260 | 195 | 170 | 410 | 510 |
| Vicat temperature | °C. | 56.8 | 69.5 | 61.8 | 73.7 | 79.4 | 64.5 | n.a. | n.a. | n.a. |
| HDT | °C. | 47.7 | 45.5 | 38.4 | 42.4 | 45.8 | 40.0 | n.a. | n.a. | n.a. |
| Tg of (A) + (B) + (C) | °C. | −46 | −48 | −46 | −48 | −48 | −48 | −43 | −46 | −46 |
| Shore D | — | 25 | 24 | 23 | 28 | 31 | 27 | 17 | n.a. | 38 |
| $n-C_6+$ extractable | % | 5.3 | 5.9 | 7.1 | 5.0 | 3.5 | 7.8 | 45.3 | n.a. | 2.5 |
| E(m %) | % | 67.5 | 70.9 | 67.4 | 71.2 | 71.2 | 69.9 | 52.2 | 61.6 | 68.1 |
| EEE | % | 51.6 | 56.1 | 51.5 | 56.1 | 57.1 | 55.8 | 32.0 | 49.7 | 57.9 |
| XEE | % | 12.7 | 12.3 | 12.5 | 12.0 | 11.3 | 11.3 | 15.6 | 9.2 | 8.0 |
| XEX | % | 3.1 | 2.5 | 3.3 | 3.2 | 2.8 | 2.8 | 4.5 | 2.6 | 2.1 |
| PPP | % | 19.6 | 17.8 | 19.5 | 16.2 | 17.5 | 18.1 | 30.7 | 28.8 | 23.5 |
| PPE | % | 5.9 | 4.5 | 6.2 | 6.1 | 5.2 | 5.7 | 9.3 | 5.0 | 4.2 |
| EPE | % | 5.4 | 4.6 | 5.4 | 6.5 | 6.0 | 6.3 | 7.9 | 4.7 | 4.2 |
| BBB | % | n.d. | n.d. | n.d. | n.d. | n.d. | n.d. | n.d. | n.d. | n.d. |
| BBE | % | 0.2 | 0.4 | 0.2 | n.d. | n.d. | n.d. | n.d. | n.d. | n.d. |
| EBE | % | 1.3 | 1.9 | 1.4 | n.d. | n.d. | n.d. | n.d. | n.d. | n.d. |
| Fraction 2 | (wt %) | 14.3 | 14.1 | 12.0 | 31.8 | 30.6 | 32.2 | 4.2 | 29.6 | 35.2 |
| E(m %) - fraction 2 | % | 98.7 | 98.0 | 98.7 | 99.2 | 99.4 | 97.5 | 97.1 | 99.6 | 99.7 |
| EEE - fraction 2 | % | 97.2 | 96.4 | 97.2 | 97.8 | 98.7 | 96.1 | 94.4 | 98.9 | 99.3 |
| XEE - fraction 2 | % | 1.5 | 1.6 | 1.5 | 1.4 | 0.7 | 1.4 | 2.5 | 0.7 | 0.4 |
| XEX - fraction 2 | % | n.d. | n.d. | n.d. | n.d. | n.d. | n.d. | n.d. | n.d. | n.d. |
| PPP - fraction 2 | % | 0.4 | 1.3 | 0.5 | 0.1 | 0.3 | 1.9 | 1.5 | 0.1 | 0.1 |
| PPE - fraction 2 | % | n.d. | n.d. | n.d. | n.d. | n.d. | n.d. | n.d. | n.d. | n.d. |
| EPE - fraction 2 | % | 0.3 | 0.3 | 0.4 | 0.7 | 0.3 | 0.6 | 1.1 | 0.4 | 0.2 |
| BBB - fraction 2 | % | n.d. | n.d. | n.d. | n.d. | n.d. | n.d. | n.d. | n.d. | n.d. |
| BBE - fraction 2 | % | n.d. | n.d. | n.d. | n.d. | n.d. | n.d. | n.d. | n.d. | n.d. |

TABLE 2-continued

Properties of polymer composition

| Example | | 1 | 2 | 3 | 4C | 5C | 6C | 7C | 8C | 9C |
|---|---|---|---|---|---|---|---|---|---|---|
| EBE - fraction 2 | % | 0.5 | 0.3 | 0.5 | n.d. | n.d. | n.d. | n.d. | n.d. | n.d. |
| ΔHfus - fraction 2 | J/g | 139.1 | 155.7 | 168.3 | 161.8 | 184.9 | 159.3 | 133.2 | 175.5 | n.a. |
| Tm1 - fraction 2 | ° C. | 126.3 | 128.3 | 130.1 | 131.1 | 134.6 | 132.3 | 127.8 | 134.8 | n.a. | n.a. = not available;
n.d. = not detectable

TABLE 3

Properties of compounds

| Example | | 10 | 11 | 12 | 13C | 14C | 15C | 16C | 17C | 18C |
|---|---|---|---|---|---|---|---|---|---|---|
| MFR | g/10 min. | 6.9 | 8.4 | 9.3 | 4.9 | 7.0 | 5.9 | 6.0 | 5.8 | 13.5 |
| Flexural Modulus | MPa | 910 | 980 | 900 | 1000 | 1080 | 960 | 1100 | 1180 | 1230 |
| Tensile Strength at Yield | MPa | 13.0 | 14.0 | 13.4 | 13.9 | 14.8 | 13.5 | 13.4 | 14.9 | 16.6 |
| Elongation at Yield | % | 8.0 | 7.7 | 8.5 | 8.0 | 7.6 | 7.8 | 4.4 | 4.0 | 6.5 |
| Tensile strength at break | MPa | 10.3 | 11.4 | 10.8 | 9.8 | 10.6 | 10.7 | 11.0 | 12.0 | 12.4 |
| Elongation at break | % | 170 | 290 | 260 | 120 | 145 | 160 | 60 | 35 | 90 |
| Gloss at 60° | ‰ | 25 | 35 | 33 | 13 | 16 | 17 | 16 | 13 | 33 |
| Longitudinal shrinkage | % | 0.44 | 0.48 | 0.42 | 0.45 | 0.61 | 0.39 | 0.48 | 0.68 | 0.60 |
| Transversal shrinkage | % | 0.63 | 0.64 | 0.67 | 0.62 | 0.88 | 0.57 | 0.66 | 0.85 | 0.78 |
| IZOD Impact Str. at 23° C. | KJ/m$^2$ | 57.7 | 56.1 | 52.2 | 63.3 | 60.7 | 58.9 | 63.3 | 55.3 | 51.1 |
| IZOD Impact Str. at −20° C. | KJ/m$^2$ | 64.1 | 51.0 | 54.7 | 64.6 | 56.8 | 64.4 | 37.7 | 16.5 | 12.0 |
| IZOD Impact Str. at −30° C. | KJ/m$^2$ | 57.1 | 43.4 | 50.6 | 55.2 | 42.0 | 59.2 | 18.0 | 15.5 | 7.3 |

What is claimed is:

1. A polyolefin composition comprising:
   (A) from about 5 to about 35% by weight of a propylene-based polymer containing about 90% by weight or more of propylene units and containing about 10% by weight or less of a fraction soluble in xylene at 25° C. ($XS_A$), both the amount of propylene units and of the fraction $XS_A$ being referred to the weight of (A);
   (B) from about 25 to about 50% by weight, of a copolymer of ethylene and a $C_3$-$C_8$ alpha-olefin containing from about 0.1% to about 20% by weight of alpha-olefin units and containing about 75% by weight or less of a fraction soluble in xylene at 25° C. ($XS_B$), both the amount of ethylene units and of the fraction $XS_B$ being referred to the weight of (B); and
   (C) from about 30 to about 60% by weight, of a copolymer of ethylene and propylene containing from about 25% to about 75% by weight of ethylene units and containing from about 55% to about 95% by weight, of a fraction soluble in xylene at 25° C. ($XS_C$), both the amount of ethylene units and of the fraction $XS_C$ being referred to the weight of (C);
   the amounts of (A), (B) and (C) being referred to the total weight of (A)+(B)+(C), wherein, following a progressive fractionation having a first, a second, and a third dissolution temperature (77° C., 100° C., and 130° C.) and the fraction collected at the second dissolution temperature corresponds to the second fractionation step and fraction 2, the composition has about 20% by weight or less of a fraction obtained in the second fractionation step (fraction 2).

2. The polyolefin composition according to claim 1, wherein the propylene-based polymer (A) is present in amount of about 15 to about 25% by weight, referred to the total weight of (A)+(B)+(C).

3. The polyolefin composition according to claim 1, wherein the propylene-based polymer (A) is a homopolymer and contains about 5% by weight or less of a fraction soluble in xylene at 25° C. ($XS_A$), referred to the weight of (A).

4. The polyolefin composition according to claim 1, wherein the propylene-based polymer (A) has a melt flow rate (230° C./2.16 kg) between about 80 to about 170 g/10 min.

5. The polyolefin composition according to claim 1, wherein the copolymer of ethylene (B) is present in amount of about 30 to about 40% by weight, referred to the total weight of (A)+(B)+(C).

6. The polyolefin composition according to claim 1, wherein the copolymer of ethylene (B) has a melt flow rate (230° C./2.16 kg) between about 1 to about 30 g/10 min.

7. The polyolefin composition according to claim 1, wherein the copolymer of ethylene and propylene (C) is present in amount of about 40 to about 55% by weight, referred to the total weight of (A)+(B)+(C).

8. The polyolefin composition according to claim 1, wherein the copolymer of ethylene and propylene (C) contains from about 45% to about 65% by weight of ethylene units, referred to the weight of (B).

9. The polyolefin composition according to claim 1, wherein the copolymer of ethylene and propylene (C) further contains from about 10% to about 30% by weight of an alpha-olefin having 4 to 8 carbon atoms.

10. The polyolefin composition according to claim 9, wherein the alpha-olefin having 4 to 8 carbon atoms is 1-butene.

11. The polyolefin composition according to claim 1, having:
   a. a melt flow rate (230° C./2.16 kg) between about 1.0 to about 5.0 g/10 min;
   b. a content of from about 30% to about 55% by weight of a fraction soluble in xylene at 25° C.;
   c. an intrinsic viscosity [η], measured in tetrahydronaphthalene at 135° C., of the XS fraction between about 2.0 to about 4.0 dl/g; and d. a total content of C4-C8 alpha-olefin units, determined by IR analysis, of about 3% by weight or higher.

12. A process for the preparation of a polyolefin composition comprising:
    at least three sequential polymerization steps,
    wherein the polyolefin composition comprises
    (A) from about 5 to about 35% by weight of a propylene-based polymer containing about 90% by weight or more of propylene units and containing about 10% by weight or less of a fraction soluble in xylene at 25° C. ($XS_A$), both the amount of propylene units and of the fraction $XS_A$ being referred to the weight of (A);
    (B) from about 25 to about 50% by weight, of a copolymer of ethylene and a $C_3$-$C_8$ alpha-olefin containing from about 0.1% to about 20% by weight of alpha-olefin units and containing about 75% by weight or less of a fraction soluble in xylene at 25° C. ($XS_B$), both the amount of ethylene units and of the fraction $XS_B$ being referred to the weight of (B); and
    (C) from about 30 to about 60% by weight, of a copolymer of ethylene and propylene containing from about 25% to about 75% by weight of ethylene units and containing from about 55% to about 95% by weight, of a fraction soluble in xylene at 25° C. ($XS_C$), both the amount of ethylene units and of the fraction $XS_C$ being referred to the weight of (C);
    the amounts of (A), (B) and (C) being referred to the total weight of (A)+(B)+(C), wherein, following a progressive fractionation having a first, a second, and a third dissolution temperature (77° C., 100° C., and 130° C.) and the fraction collected at the second dissolution temperature corresponds to the second fractionation step and fraction 2, the composition has about 20% by weight or less of a fraction obtained in the second fractionation step (fraction 2)
    and components (A), (B) and (C) are prepared in separate subsequent steps, operating in each step, except the first step, in the presence of the polymer formed and a catalyst used in the preceding step.

13. A formed article comprising:
    a polyolefin blend of
    (i) the polyolefin composition comprising:
    (A) from about 5 to about 35% by weight of a propylene-based polymer containing about 90% by weight or more of propylene units and containing about 10% by weight or less of a fraction soluble in xylene at 25° C. ($XS_A$), both the amount of propylene units and of the fraction $XS_A$ being referred to the weight of (A);
    (B) from about 25 to about 50% by weight, of a copolymer of ethylene and a $C_3$-$C_8$ alpha-olefin containing from about 0.1% to about 20% by weight of alpha-olefin units and containing about 75% by weight or less of a fraction soluble in xylene at 25° C. ($XS_B$), both the amount of ethylene units and of the fraction $XS_B$ being referred to the weight of (B); and
    (C) from about 30 to about 60% by weight, of a copolymer of ethylene and propylene containing from about 25% to about 75% by weight of ethylene units and containing from about 55% to about 95% by weight, of a fraction soluble in xylene at 25° C. ($XS_C$), both the amount of ethylene units and of the fraction $XS_C$ being referred to the weight of (C);
    the amounts of (A), (B) and (C) being referred to the total weight of (A)+(B)+(C), wherein, following a progressive fractionation having a first, a second, and a third dissolution temperature (77° C., 100° C., and 130° C.) and the fraction collected at the second dissolution temperature corresponds to the second fractionation step and fraction 2, the composition has about 20% by weight or less of a fraction obtained in the second fractionation step (fraction 2); and
    (ii) at least about 50% by weight, referred to the total weight of the polyolefin composition, of one or more additional polyolefins.

14. The formed article according to claim 13, wherein the article is injection molded.

* * * * *

UNITED STATES PATENT AND TRADEMARK OFFICE
CERTIFICATE OF CORRECTION

| | |
|---|---|
| PATENT NO. | : 10,385,199 B2 |
| APPLICATION NO. | : 15/738782 |
| DATED | : August 20, 2019 |
| INVENTOR(S) | : Cavalieri et al. |

It is certified that error appears in the above-identified patent and that said Letters Patent is hereby corrected as shown below:

In the Specification

In Column 7, Line 30, delete "diatomaceaous" insert -- diatomaceous --, therefor
In Column 7, Line 53, delete "weighting" and insert -- weighing --, therefor
In Column 10, Line 36, delete "that" and insert -- than --, therefor Signed and Sealed this
Second Day of August, 2022

Katherine Kelly Vidal
*Director of the United States Patent and Trademark Office*